United States Patent
Hunt et al.

(10) Patent No.: US 7,242,569 B2
(45) Date of Patent: *Jul. 10, 2007

(54) TUNABLE CAPACITORS USING FLUID DIELECTRICS

(75) Inventors: Andrew T. Hunt, Atlanta, GA (US); Mark G. Allen, Atlanta, GA (US)

(73) Assignee: nGimat, Co., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,592

(22) Filed: Jun. 15, 2006

(65) Prior Publication Data

US 2006/0245140 A1 Nov. 2, 2006

Related U.S. Application Data (62) Division of application No. 10/493,131, filed on Aug. 30, 2004, now Pat. No. 7,088,567.

(51) Int. Cl.
*H01G 7/00* (2006.01)

(52) U.S. Cl. ............... 361/277; 361/272; 361/273; 361/283.3; 361/287; 361/292

(58) Field of Classification Search ........... 361/272, 361/273, 277, 278, 290, 281, 282, 287, 283.3, 361/284, 292, 279
See application file for complete search history.

(56) References Cited

U.S. PATENT DOCUMENTS

| | | | | |
|---|---|---|---|---|
| 5,162,972 A | * | 11/1992 | Gripshover et al. | 361/277 |
| 6,975,498 B2 | * | 12/2005 | Kato | 361/277 |
| 7,031,136 B2 | * | 4/2006 | Hunt et al. | 361/277 |
| 7,085,122 B2 | * | 8/2006 | Wu et al. | 361/277 |
| 7,088,567 B2 | * | 8/2006 | Hunt et al. | 361/277 |
| 7,190,565 B1 | * | 3/2007 | Marantz | 361/277 |

* cited by examiner

*Primary Examiner*—Nguyen T. Ha
(74) *Attorney, Agent, or Firm*—Wayne E. Nacker; Alfred H. Muratori (57) ABSTRACT

Capacitors 10, 20, 40, 50, 70, 80) having a fluid dielectric material that is transported or undergoes a phase change are disclosed. The dielectric medium change results in a change in the total dielectric constant of the material between the electrodes (12, 14, 72, 74, 81, 82), thus changing the capacitance of the capacitors. Transporting or phase changing the dielectric fluids into and out of a the electric field of the capacitor, changes the effective dielectric constant and the capacitance of the capacitor.

14 Claims, 4 Drawing Sheets

TUNABLE CAPACITORS USING FLUID DIELECTRICS

CROSS REFERENCE TO RELATED APPLICATION

This is a divisional application Ser. No. 10/493,131 filed on Aug. 30, 2004 is now U.S. Pat No. 7,088,567, the entire disclosure of which is incorporated here in reference.

FIELD OF THE INVENTION

The present invention is directed to tunable capacitors. In particular, the invention is directed to capacitors having a fluid (gas and/or liquid) dielectric material that is displaced or changes phase to thereby produce a large change in the effective dielectric constant and the overall capacitance of the capacitor.

BACKGROUND OF THE INVENTION

Several types of tunable capacitors have been used in electronics. These include physically tuned capacitors where the plates of the capacitor are moved relative to each other to change the amount of effective area of the plates, or the distance between the plates, to thereby change the capacitance of the capacitor. These types of capacitors can have a large amount of variance in their capacitance, but they require an actuator to be controlled automatically. Other tunable capacitors include those that use electrically active materials that have a dielectric constant that can be changed by applying an electric field through the material. These materials are either ferroelectric (f-e) or paraelectric (p-e). While the dielectric constant of these materials can be change relatively quickly, the change in capacitance with a voltage applied is rather small.

Electrical, radio frequency (RF), or microwave applications of these tunable capacitors include such general classifications as varactor diode replacement, tunable filters, phase shifters, multiplexers (to include duplexers), voltage controlled oscillators, tunable matching networks for power amplifiers (PA's), low noise amplifiers (LNA's), thermo-electric effects including power systems, general impedance matching networks, and charge pumps.

Tunable capacitors can be exploited in the design of components, subsystems and/or systems in mobile communication systems to achieve:

1) new capability and improved electrical (RF or microwave) performance over a wide range of frequencies but most particularly from 300 MHz to ~30 GHz
2) smaller size,
3) lower power consumption,
4) less weight, or any combination of these four items as determined by specific system design requirements.

Electronics, including wireless handsets are characterized by their need for low voltage operation, typically <40 VDC, and ideally <3.0 VDC. It is expected that this voltage will decrease further in future designs. Thus, any tunable device must be able to be designed in such a way as to create appropriate electric fields from a small DC power supply voltage. One way to achieve a suitable geometry is to design variable capacitors consisting of thin films of f-e materials, with closely spaced biasing electrodes. The small DC tuning voltage also results in reduced power consumption (and heat dissipated) from RF and E-O devices. Another use of tunable capacitors to achieve the tunability required is to provide a higher tuning voltage from a low voltage source using charge pumps. This is done conventionally by charging a number of capacitors in parallel and them switching them to a series configuration, to add the voltages together. These techniques provide tunable capacitors, while avoiding the limitations of f-e materials.

Another use of interest for the capacitors of the present invention, is pressure or temperature sensors. Changes in temperature/pressure affect many applications and smaller temperature/pressure sensors are always in need in a wide range of industries that include hydraulic and pneumatic systems. Currently these work on a number of principles including the movement of one capacitor electrode relative to another electrode. The relative movement between electrodes causes a change in capacitance which results in a change in an electrical signal that is used to detect and/or direct the operation of systems. The higher the capacitance change the more sensitive the feedback of data and the greater the accuracy of system control.

SUMMARY OF THE INVENTION

To achieve a high degree of tunability, with a usable speed switching action, the capacitors of the present invention use a dielectric material that is displaced or undergoes a phase change. Gasses have a much lower dielectric constant then liquids of the same material. Therefore, when a capacitor has a dielectric material that is liquid at a first temperature and a gas at a higher temperature, its capacitance will be reduced significantly when the material changes phase from a liquid to a gas. This phase change can be accomplished by a number of methods. Using ambient conditions, the phase change can take place at a specific ambient temperature; and the dielectric material can be "tailored" to change phase at this specific temperature. Obviously, a heater may be added to heat the material to the vaporization point. Preferably, the material is in a small enough quantity (such a thin film capacitors, where only a small amount of dielectric material is needed) that only a small amount of energy is required to vaporize the material. This energy may alternatively be supplied by the electrodes of the capacitor in the form of leakage current through an adjacent resistor or the dielectric material. Many forms of stimulus may be used to cause the phase change. These include, but are not limited to: excitation through agitation, heat (resistive at or near the electrodes or leakage current for high voltage applications); electric field, mechanical such as ultrasound, photons.

A change of pressure can precipitate the phase change between liquid and gas states. The capacitance will be reduced significantly when the materials change from a liquid to a gas which is much more than the change in capacitance brought about by changes in temperature only of a single phase solid, liquid or gas dielectric material. This change can be accomplished as a function of feedback from the surrounding system and used to control systems and their operation. In chemical processing and other industries, the pressure at which reactions are made can be a significant factor. Pressure sensors are also needed in control of fluid flows. Atmospheric science, space applications and mobile systems require smaller and more compact sensors. Dead space/volume in any chemical process or system should be minimized. By having a low profile sensor that includes a material that changes from a liquid to a gas phase, dead space can be minimized. These sensors can also be smaller than what current systems use, because they provide a larger change in capacitance per area for increased feedback to the control electronics of the system. By having one of the electrodes against the solid substrate and the other electrode exposed to the pressure of the medium to be detected the changeable liquid/gas mixture will provide a larger change in capacitance than a single phase fluid (gas or liquid) body of the existing art.

The phase change of the dielectric material does not need to necessarily occur to all of the dielectric material. Two phase fluids that exist as part gas and part liquid can also be used as dielectric material to provide less of a switch-like change in the capacitance. As more of the two phase fluid becomes gas, the lower the overall dielectric constant of the two-phase fluid. A series of liquids may also be used as the dielectric, each having a different boiling point. In this manner, a step function of capacitance can be realized. As each liquid is vaporized, the overall dielectric constant of the dielectric material is decreased by an amount that can be predetermined, thereby providing the step function of capacitance. The material and/or capacitor architecture can be designed to provide a large step change in capacitance or to approximate a continuum of capacitances. In this manner an exceptionally sensitive temperature monitoring device or thermal correction capacitors can be designed for specific ranges.

As the liquid expands upon vaporization, additional volume may be needed for the resulting gas. The capacitor may include a porous material that provides enough space for the gas, while also retaining the liquid phase of the material. A separate chamber may be provided or used in conjunction with the porous material to provide the required space. In a further embodiment, the walls of the capacitor expand, such that as the liquid becomes a gas the plates of the capacitor are pushed farther apart. This results in a further decrease in the capacitance as $C=k A/d$, wherein C is the capacitance, k is the dielectric constant, A is the area of the plates and d is the distance between the plates. Thus in this embodiment, a change in capacitance is achieved form both the dielectric constant change of the dielectric, as well as the change in the distance between the plates.

Another method used by the present invention to cause a large change in capacitance is by transporting dielectric fluid into and out of the electric field between the capacitor electrodes. Generally, one of these dielectrics is liquid, and the low dielectric constant is a gas that has a large effect on the capacitance change. Although gasses could be used in many of the following examples of fluid transporting, two immiscible liquids with different dielectric constants could also provide the desired functionality. A first chamber or chambers are provided in close proximity or between the electrodes of the capacitor. This first chamber may more closely resemble a narrow fluid path with electrode on opposing sides. A second chamber or chambers are provided to store the fluid(s) that are at a distance from and not between the electrodes. A transporting device is then used to move the dielectric fluid from the first chamber(s) to the second chamber(s), thereby changing the overall dielectric constant of the material in the electric field between the electrodes. One way of transporting the fluid dielectric is through the use of microelectromechanical (MEMs) devices. MEMs technology includes piezoelectric pumps and diaphragms. Another method of moving the dielectric fluid is through movement of magnetic or conductive particles suspended in the dielectric fluid. By influencing the particles with a magnetic or electric field, the dielectric fluid is drawn along with the particles. Heat can also be used to move a dielectric liquid from one area to another. The heat required to move the liquid can be much less than the heat required for a change in phase, thus reducing the energy required to switch the capacitance.

In general, to provide higher capacitance values for most applications it is desired that the gap between the electrodes be small. Liquids can have difficulty flowing between extremely small cross sections due to surface tension effects that add significant resistance to fluid flow. The wider the space in the electrodes, however, the lower the capacitance of the final capacitor, per unit length of electrode. Therefore, it can be desired to have interdigital capacitors or wider cross-sectional area electrodes so that large value capacitors can be made smaller. One way of forming the materials and electrodes close to each other, while still being able to have an encapsulated liquid system, would be for the electrodes to have a short protrusion into the fluid path. Therefore, when the liquid was not present there would be air not only directly between the facing electrode surfaces but also on between the top and bottom electrode surfaces. An additional benefit in this design is that the non-flowing dielectric medium, in which the electrodes are mounted, will have a higher dielectric constant than the gasses themselves. If they are adjacent to the electrodes, with just a small gap between the electrodes, the electric fields will run preferentially through the dielectric of the enclosing material rather than through the gas phase. Therefore, an important aspect of this invention is that these electrodes protrude into the fluid region such that the encapsulating dielectric medium is set back from the electrode gap by at least 25% of the gap separation between the electrodes. More preferentially, the encapsulating dielectric medium is set back from the electrode gap by at least 50% of the gap separation, and even more preferentially, 100% of the same gap distance. By this arrangement, the dielectric medium interacts with the electric field of the capacitor, regardless of the fluid in the gap area. By having the electrodes protrude into the fluid channel, the effect of the higher dielectric constant of the surrounding dielectric material vs. the gas material is minimized. It is desired that the path length for the electric field through the enclosing dielectric medium be an aspect of its dielectric constant in comparison to that of the gas. Thus, if the dielectric value of the solid enclosing dielectric were 4, then the gap length through the solid dielectric should be at least 2× that of the gap spacing between the electrodes, more desirably 3×, and most desirably, at least 4× the length of that between the electrodes.

By having a larger fluid channel that extends beyond the gap of the electrodes, potential smaller gaps between the electrodes can be enabled, as opposed to capacitors wherein all of the fluid is required to flow only between the electrodes. Otherwise, systems/liquids that require a 10 micron diameter channel to flow, would also require that the electrodes be spaced at 10 microns. With the suggested configuration, the electrodes can be spaced 1 micron, 2 microns or whatever the desired spacing in microns to give the higher capacitance desired out of the tunable system while still maintaining a small overall size to the capacitor.

The high and low capacitance values will be a function of the electrode cross sectional area, the gap spacing and the dielectric values of the two fluids used. If one of them is a gas, then its dielectric value will be close to 1 and the liquid used will be most likely in the 3-100 range. Therefore, capacitance changes of greater than 3× are readily attainable with the present invention, more preferably greater than 8×, more preferably greater than 20× and even with potentially capacitance changes as high as 100×.

With the current microelectronic manufacturing processes, electrode gaps could be even smaller into the submicron range between the electrodes. Of course, this is beyond the current capability of liquid fluid channeling capability. Therefore, a larger fluid channel would be advantageous with this narrower gap that is achievable through electronic processing.

Another aspect of the present invention would be a phase change between a vapor and a liquid wherein the electrodes are effectively cool and a liquid condenses between the electrodes forming an area of higher effective dielectric. When this system is heated to a certain level, the liquid and/or solid in the case of sublimation would then reenter into the gas phase of the surrounding material with the associated change in dielectric value.

The capacitors of the present invention can be used with other larger-value capacitors, to offset the thermal coefficient of capacitance of the larger caps. By providing a capacitor that automatically changes its capacitance to offset the change in the larger prior art capacitor, a system with a non-temperature dependent capacitance can be achieved.

It should be understood that while the phase change is described here predominately as a liquid to gas or gas to liquid phase change, other phase changes would also result in a change in dielectric constant. These phase changes further include solid to liquid and liquid to solid, as well as solid to gas (sublimation) and gas to solid.

DETAILED DESCRIPTION OF THE PREFERRED EMBODIMENTS

The present invention may be understood more readily by reference to the following detailed description of preferred embodiments of the invention and the figures.

Figure 1:
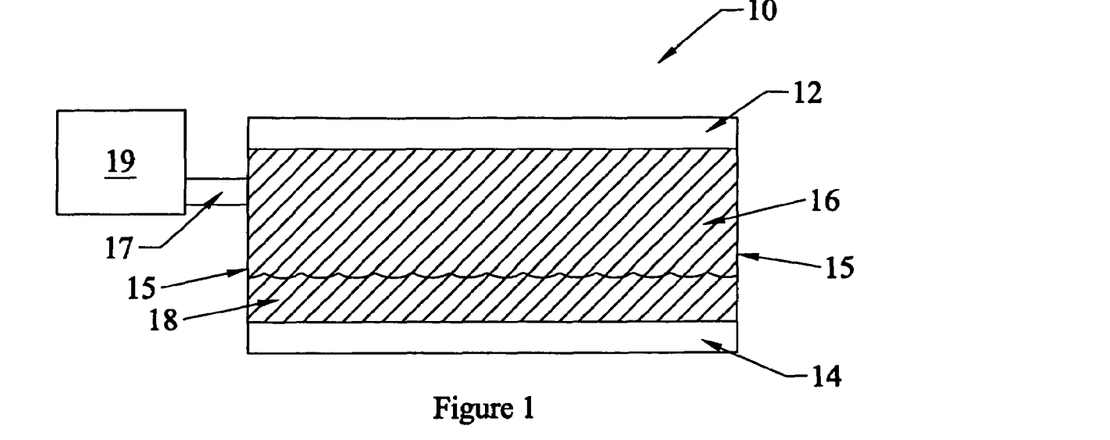
FIG. 1 is a side view of a first embodiment of the capacitor of the present invention.

FIG. 1 shows a first embodiment of the capacitor 10 of the present invention. A top electrode 12 and a bottom electrode 14 are shown, although 12 could represent two electrodes in interdigital arrangement, as is known in the art of thin film capacitors. Further electrode 14 could simply be a retaining wall for the fluid dielectric, or a heater as explained below. The dielectric fluid is shown as liquid 18, that is retained within the capacitor by electrode(s) 12, wall or electrode 14, and side walls 15. An optional porous medium 16 is provided to minimize movement of the dielectric in the liquid state, while providing room for expansion of the dielectric when it is in the gaseous state.

A previously described, upon heating, the dielectric 18 is vaporized or boiled, such that all or some of the liquid is changed to a gas. This results in a dielectric with a much lower dielectric constant, and a corresponding reduction in capacitance. Should a material be used that requires a greater volume when in the gas state, a separate chamber 19 can be provided, with a suitable passageway 17 between the capacitor 10 and chamber 19. In order to heat the dielectric, a heater can be provided at 14 (when 12 represents interdigital electrodes) or the heater can be arranged along sides 15, or at another location in close proximity to the capacitor 10. A wide range of heater control voltages can be used even voltages lower than 2.5 Volts.

Figure 2:
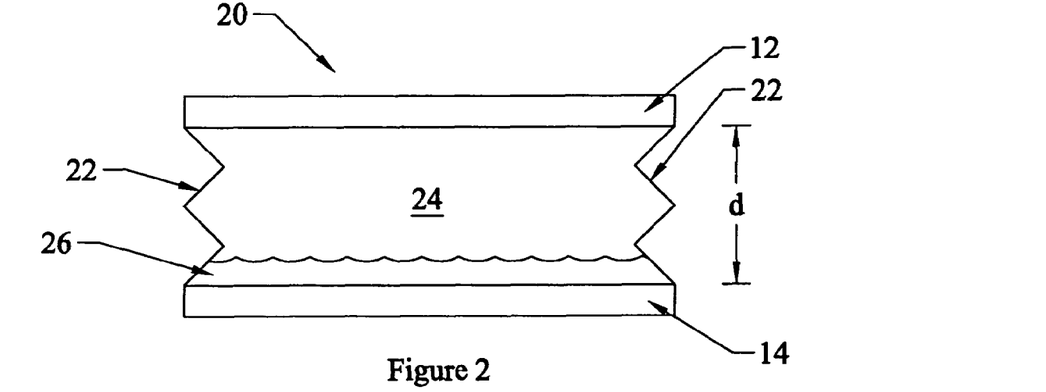
FIG. 2 is a side view of a second embodiment of the capacitor of the present invention having flexible walls.
Figure 3:
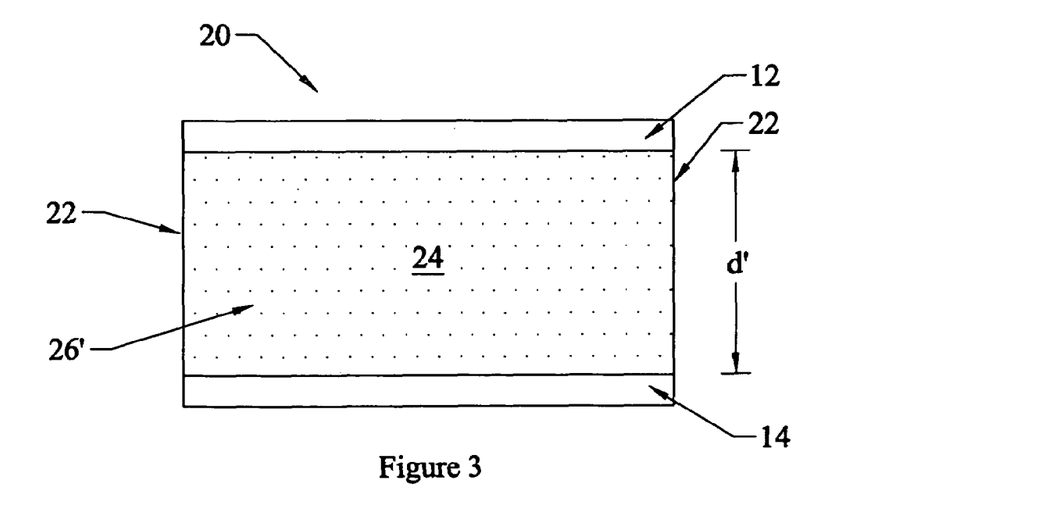
FIG. 3 is a side view of the capacitor of FIG. 2, with the flexible walls extended.

FIGS. 2 and 3 illustrate a further embodiment of the capacitor 20 of the present invention. Electrodes 12 and 14 are shown connected to each other by flexible side walls 22, and separated by a distance d, to form space 24. As the dielectric liquid 26 is heated and boiled, the resulting gas pressure causes the capacitor to expand (see FIG. 3) increasing and filling space 24 with dielectric gas 26'. With total expansion, the electrodes 12 and 14 are spaced d' from each other. In this way, the capacitance is reduced not only by the reduction in the dielectric constant of the two-phase dielectric fluid, but is also decreased by the increase in plate separation from d to d'. Should additional space be required for excess dielectric gas, a separate chamber 19 can be provided, with a suitable passageway 17, as with capacitor 10. A separate heater (not shown) can also be provided in the separate chamber 19 if desired or required to change the state of the dielectric fluid and possibly control fluid flow back to the capacitor. Alternatively, mechanical means (such as MEMs devices) can be used to cause a phase change via pressure changes when moving the electrodes. The capacitance of the system is then not only decreased by the separation of the electrodes, but the electrodes being moved apart causes a decrease in pressure that results in a phase change of the dielectric fluid, resulting in the evolution or increase of the gas phase, thereby further decreasing the dielectric constant and the capacitance. Moving the electrodes back toward one another will then have the opposite effect.

In all of the above-described embodiments of the capacitor of the present invention, the dielectric material may be formed of one or more materials. These materials may exist as two phase fluids such that they are part liquid (with a relatively high dielectric constant) and part gas (with a relatively low dielectric constant). In this way, the change in dielectric constant, while large, can be done in a continuous manner, as opposed to a step function when all of the dielectric material is vaporized in a short period of time. Further, the dielectric material may be a mixture of several liquids, each having a different boiling point. This would provide a multi-step function, with a step decrease in capacitance as the dielectric temperature reaches each boiling point. Pure liquids that have nominal or no ions, yield low leakage current and are non-interactive with the electrode surfaces, although a liner (of any effective barrier, such as silica or Pt) can be provided with the electrodes to avoid interaction between more chemically active or ionic liquids and the primary electrode material (usually copper, aluminum, gold or other good conductors).

Because the change in dielectric constant is rather large when a material changes from the liquid state to the gas state (and vise-versa) it may be useful to combine the capacitor of the present invention with a tunable capacitor having a ferro (or para) electric dielectric, as is known in prior art capacitors. This would provide gross tuning by the phase-change capacitor and fine tuning by the ferroelectric capacitor. These two capacitors can be combined by placing a layer of ferroelectric material by interdigital electrodes 12, and also providing a phase-change dielectric in porous material 16. In this manner, a tuning voltage could be used on electrodes 12 to tune the ferroelectric layer, and a heater could be employed to change the state of dielectric fluid 18. Alternatively, the dielectric fluid could be affected by ambient temperature to provide the self-correcting capacitance with temperature as described above.

Figure 4:
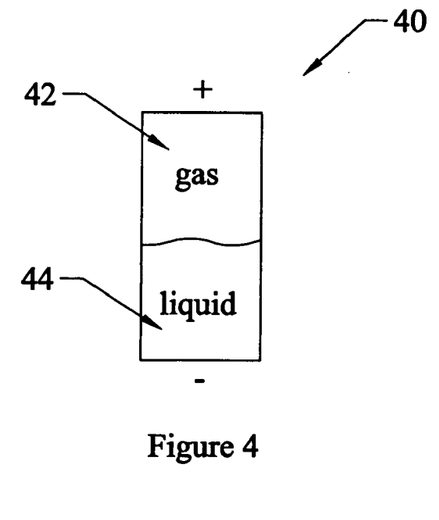
FIG. 4 shows a third embodiment of the capacitor of the present invention.

The architecture of the capacitor can also affect the phase change of the material. In FIG. 4, a capacitor 40 having the gas 42 and liquid 44 phases of the dielectric material in series between the electrodes, is shown. This can be represented by two capacitors in series, one having a gas dielectric (and corresponding relatively low dielectric constant), and the other with a liquid dielectric (and corresponding relatively low dielectric constant). Thus the overall capacitance of the system is $C_{40}=1/(1/C_{42}+1/C_{44})$. This results in a large and rapid temperature and/or pressure change (and in the capacitance) as the liquid becomes gas followed by a slower, smaller change because smaller capacitance of the gas 42 portion dominates the capacitance of the system.

Figure 5:
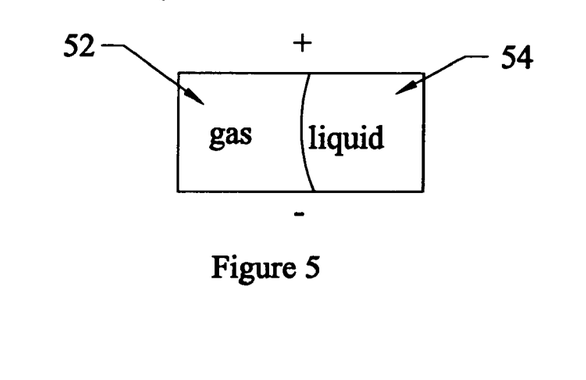
FIG. 5 shows a fourth embodiment of the capacitor of the present invention.

In FIG. 5 a second capacitor 50 is shown wherein the gas 52 and liquid 54 phases of the dielectric material are in parallel between the electrodes. This can be represented by two capacitors in parallel, one having a gas dielectric (and corresponding relatively low dielectric constant), and the other with a liquid dielectric (and corresponding relatively low dielectric constant). Thus the overall capacitance of the system is $C_{50}=C_{52}+C_{54}$. This results in a continuous change in the dielectric constant as the liquid is slowly changed to gas, because the larger capacitance of the liquid 54 portion dominates the system.

As examples of dielectric materials for the capacitor of the present invention, the following materials are shown with estimated dielectric constants for different temperatures.

| Material | Temperature | Dielectric constant |
| --- | --- | --- |
| Octane | 24° F. | 1.061 |
| Octane | 68° F. | 2.0 |
| Phenol | 118° F. | 9.9 |
| Phenol | 104° F. | 15.0 |
| Phenol | 50° F. | 4.3 |
| Tartaric acid | 68° F. | 6.0 |
| Tartaric acid | 14° F. | 35.9 |
| Water | 32° F. (liquid) | 88.0 |
| Water | 68° F. (liquid) | 80.4 |
| Water | 212° F. (liquid) | 55.3 |
| Water | 212° F. + (steam) | 1.00785 |

It is to be understood that this list is abbreviated, and should not be considered limiting. A large number of materials exhibit a dielectric change with temperature (usually undesired), and any of these materials or combination of these materials may be used depending on their physical, chemical and other properties in addition to any change in dielectric constant.

Another important aspect of the dielectric material is the temperature of the phase change at specific pressures. The following table lists the boiling points for water for specific pressures.

| Boiling Point | Pressure |
| --- | --- |
| 166° F. | 5" Hg |
| 184° F. | 15" Hg |
| 212° F. | 30" Hg (atm.) |
| 268° F. | 60" Hg |
| 323° F. | 90" Hg |

Figure 6:
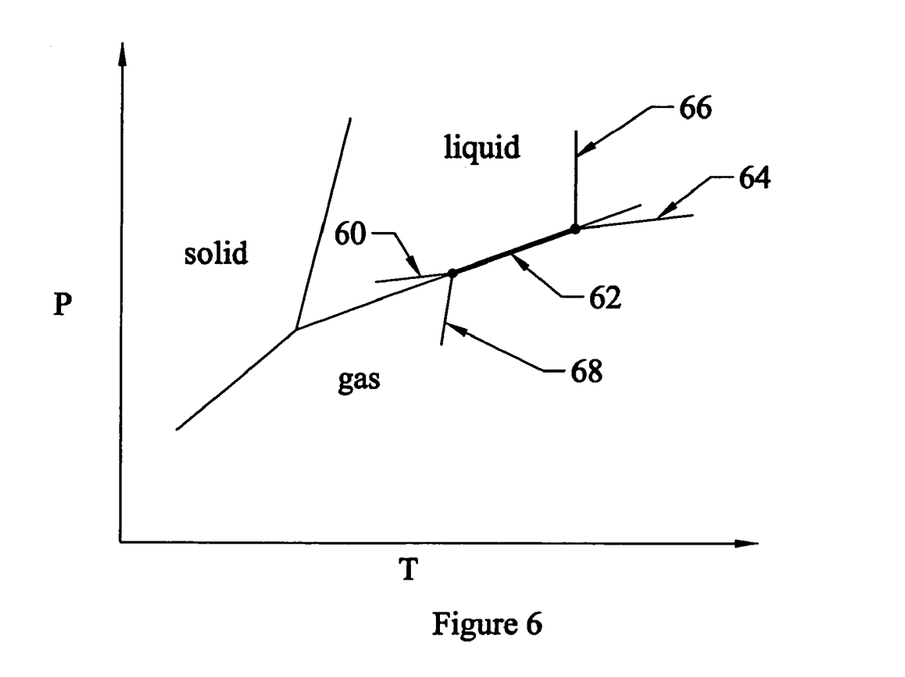
FIG. 6 is an example of a phase diagram.

As is known, the phase change of a material is dependent on both pressure and temperature. FIG. 6 is an example phase diagram illustrating the relationship between material phase, pressure and temperature. When temperature is the predominate phase change mechanism, the material changes temperature with little change in pressure as shown at line 60. When the temperature reaches the boiling point, the pressure of the two phase liquid/gas increases with the increase in temperature as shown along line 62. This 2-phase region is the zone of significant capacitance change. Once the dielectric changes to a gas, the temperature of the dielectric can once again increase with pressure change according to gas laws as shown along line 64. When pressure is the predominate phase change mechanism, the pure liquid material can change in pressure with little change in temperature (except for thermal expansion) as shown along line 66. When the pressure reaches the boiling point at the 2-phase line, the temperature of the dielectric decreases with a decrease in pressure as shown along line 62. Again, the 2-phase line is the region of significant capacitance change. Once the dielectric material changes phase to a gas, the pressure can continue to drop with little change in capacitance or temperature as shown along line 68. Obviously, both pressure and temperature can be changed to affect the phase change. Thus these mechanisms can be used to adjust or control the capacitance, or the capacitor can be a sensor of temperature and/or pressure changes.

Figure 7:
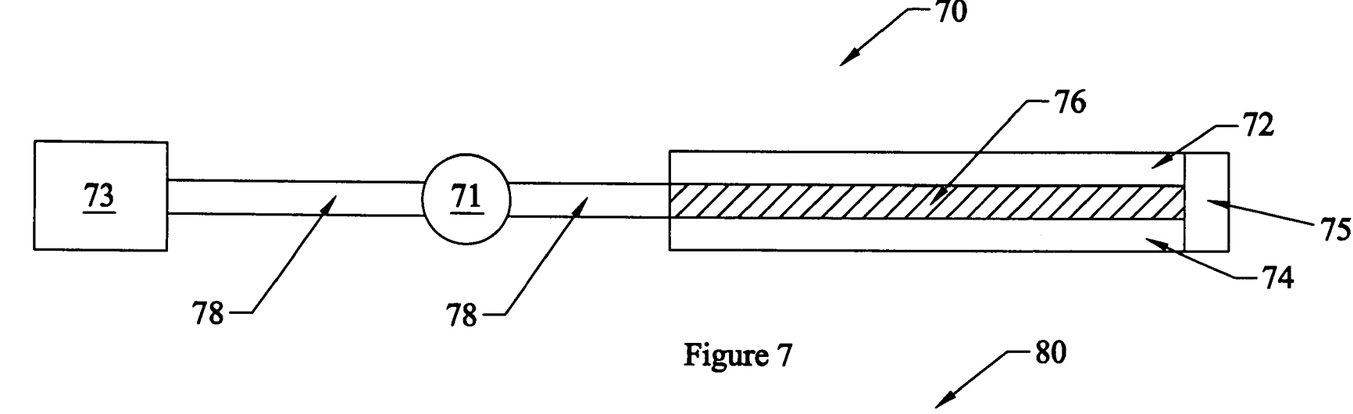
FIG. 7 shows a fifth embodiment of the capacitor of the present invention.

In FIG. 7, a fifth embodiment 70 of the capacitor is shown. Capacitor 70 includes a first electrode 72, a second electrode 74, and a chamber 76 between the electrodes. A dielectric fluid is transported into and out of chamber 76 to thereby increase and decrease the effective dielectric constant between the electrodes. Conduit 78 provides a pathway for the dielectric fluid, while 71 is a reversible pump for moving the dielectric fluid. Overflow chamber 73 is optionally provided as a storage area for the dielectric fluid, should one be required. Optional pump 71 and overflow chamber 73 may be combined as a moveable diaphragm, that decreases the pressure in conduit 78 to draw the dielectric fluid out of chamber 76, or increases the pressure in conduit 78 to force the dielectric fluid back into chamber 76. Another mode of the present invention is a heater 75 that can be provided as the transporting device. Heat applied to an opposite portion of chamber 76 (chamber 76 is best configured as a capillary tube in this embodiment) will act on the dielectric liquid to seek the cooler temperatures in conduit 78. Another method of moving the dielectric fluid to and from chamber 76 is the use of a magnetic or electric field, and the use of magnetic or electrically conductive dielectric fluid or particles within the dielectric liquid. In another possible device of the present invention, the coil (not shown) is wound about capacitor 70 and conduit 78. By passing an electric current through the coil, a magnetic field is set up either into or out of the chamber 76. Reversing the current will reverse the direction of the magnetic field and fluid flow. While not as strong, electric fields can be used in the same way, causing fluid flow through electrophoresis. Electrodes 72 and 74 may be in the form of a planar interdigital capacitor, in which case the chamber 76 may be just above or below the plane of the electrodes. The placement of the chamber is critical only in that it must lie within (at least partially) the electric field applied between the two electrodes. The pump 71, diaphragm or other mechanical pumping mechanism may be in the form of MEMs devices or may be operated by other well known mechanisms. The important aspect of this embodiment being the transporting of the dielectric fluid into and out of the electric field of the capacitor, to thereby dramatically change the effective dielectric field. Experimentation has shown that on a simple planar capacitor, the addition of a small drop of 10 Meg (de-ionized) ohm water on top of the electrodes, increased the capacitance nine times (see the example below). Obviously depending on the dielectric fluid used, the walls of chamber 76 must be non-reactive with the fluid. Insulative walls must be used with conductive fluids or with fluids highly loaded with conductive particles (to avoid shorting the capacitor).

Figure 8:
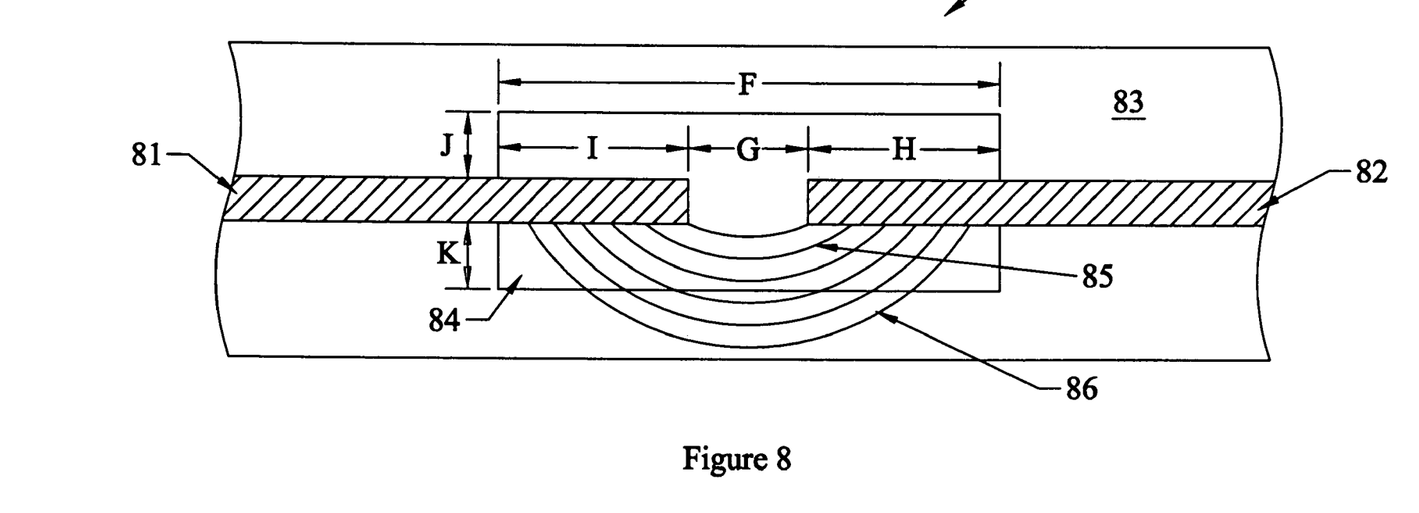
FIG. 8 shows a sixth embodiment of the capacitor of the present invention.

FIG. 8 shows a further embodiment of a capacitor 80 of the present invention. Electrodes 81 and 82 are mounted and supported in a dielectric medium 83. Inside the dielectric is a fluid chamber 84. The electrodes extend into the chamber of width F a distance H or I and form a gap of distance G. The electric field between the electrodes includes portions 85 that extend only through the fluid chamber 84 and portions 86 that extend through both the dielectric 83 as well as through chamber 84, and even field lines further out (not shown) that extend through the dielectric 83 only. This configuration has many advantages, as described above. One of these advantages is the ability to form very small size capacitors that include a fluid chamber 84 large enough for fluid to flow, while allowing a smaller gap width G, for greater capacitance values. Distance J and K are is at least 25% of the gap separation G between the electrodes, more preferably 50%, and even more preferentially, 100% of the same gap distance. That is to say that the sum of the distance H and distance I is less than the length of the chamber F, such that gap is formed between the electrodes with length G, and F is at least two times G. In this configuration, the sum of J and K is at least half the length of the gap G. In the second embodiment, F is at least four times G, and the sum of J and K is at least equal to G. By this arrangement, the dielectric medium about the chamber interacts less with the electric field of the capacitor, regardless of the fluid in the gap area. In general, it is preferred for H and I to be similar in form and also J and K to be similar in form. Functionality is provided even if H or I is 0 (flush with the chamber end) and/or if one of J or K is 0 (extending along the top or bottom of the chamber). Of course, one should bear in mind that top and bottom and sides are only terms for illustration and the capacitor can have any orientation. Further, the two electrodes can be offset and/or overlapping in which case the gap G would be the minimum separation between the electrodes. By having the electrodes protrude into the fluid channel, the effect of the higher dielectric constant of the surrounding dielectric material vs. the gas material is minimized. It is desired that the path length for the electric field through the enclosing dielectric medium be an aspect of its dielectric constant in comparison to that of the gas. Thus, if the dielectric value of the solid enclosing dielectric was 4 compared to most gases being near 1, then the gap length through the solid dielectric should be at least 2× that of the gap spacing between the electrodes, more desirably 3×, and most desirably, at least 4× the length of that between the electrodes.

Figure 9:
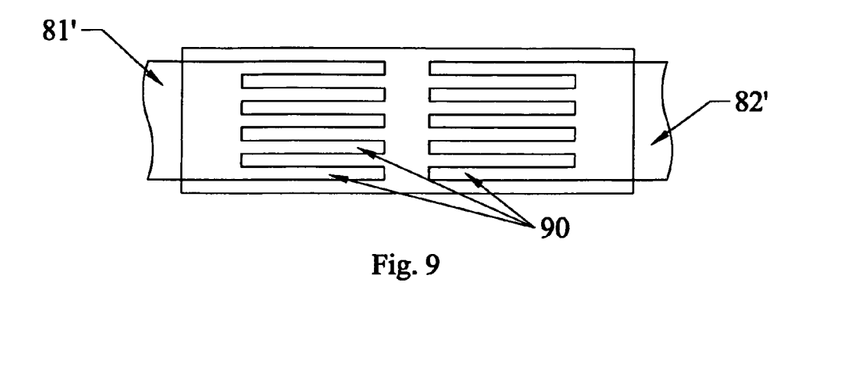
FIG. 9 shows a seventh embodiment of the capacitor of the present invention.
Figure 10:
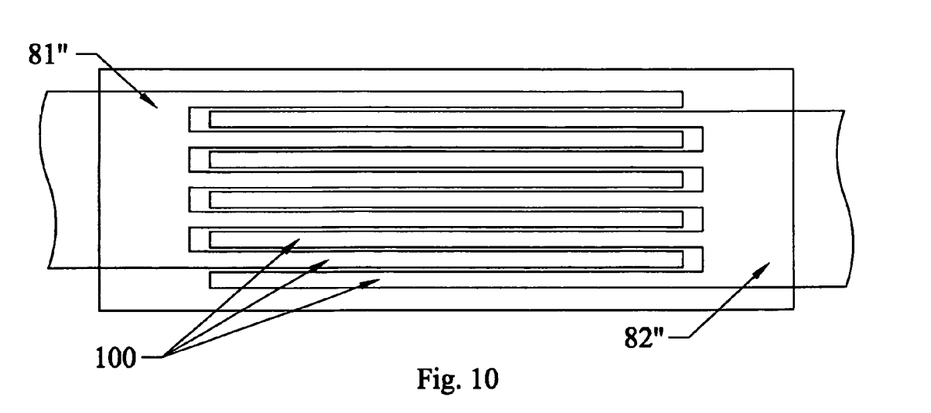
FIG. 10 shows an eighth embodiment of the capacitor of the present invention.

In a further embodiment electrodes 81' and 82' have a number of elements 90 that extend near to one another as shown in FIG. 9. In yet another embodiment as shown in FIG. 10, the elements 100 of electrodes 81" and 82" extend past one another in an interdigital fashion. The orientation of the electrodes and offsets should not be considered as limiting and can be any functional angle or distance.

The figures, structures and materials are not to be deemed as limiting. Rather than a liquid and a gas phase, multiple phases can be present. Immiscible liquids of differing dielectric values can be used and moved similarly to the much discussed liquid gas interfaces. Similarly, solid phases that dissolve or sublime can be used or even supercritical fluids can be used. Supercritical fluids are fully variable without any phase change and thus can be ideal. Supercritical fluids near the liquid region have properties more similar to liquids (higher k) and become more gas-like with increasing temperature or decreasing pressure, thus continuously lowering the dielectric constant, but at a much higher rate than that of non-supercritical fluids. Also, gases that are soluble in liquid can be used as well as materials that vary in immiscibility. The capacitance of the system can be changed by dissolving a gas in a liquid and then forcing or having an environment where the gas comes out of the liquid or goes back into the liquid.

EXAMPLE

A strip capacitor was formed by depositing a 50 nm layer of chrome on a sapphire substrate. A two micron layer of copper was then deposited on the chrome, followed by 100 nm of gold. The metal layers were then photolithograhically patterned to form the two electrodes separated by a gap. The capacitance of the system was measured and the dielectric constant of the sapphire (air) between the electrodes was determined to be about 9-10. Ultra-pure deionized water was then placed in the gap and the capacitance was again measured. With the water in the gap the dielectric constant was found to be about 80-90. The system was cleaned and dried and the experiment was repeated several times, each with the same result. Thus the expected results of about a 10× change in dielectric constant was confirmed.

What is claimed is:

1. A capacitor comprising:
    a first electrode;
    a second electrode;
    a dielectric material comprising at least two fluid dielectrics;
    means for changing the dielectric constant of the dielectric material via a phase change of the dielectric material from liquid to solid, liquid to gas, or solid to gas, or vary physical properties of a supercritical fluid; and
    means to transport at least one of said at least two fluid dielectrics.

2. The capacitor of claim 1, wherein said means to transport said at least one fluid dielectric comprises a pump.

3. The capacitor of claim 2 further comprising a storage chamber and a chamber in close proximity to said first and second electrodes and wherein said pump transports said at least one dielectric fluid from said chamber in close proximity to said first and second electrodes to said storage chamber and from said storage chamber to said chamber in close proximity to said first and second electrodes.

4. The capacitor of claim 3 wherein said pump comprises a MEMs device.

5. The capacitor of claim 1 wherein said means to transport said at least one fluid dielectric comprises a movable diaphragm.

6. The capacitor of claim 5 wherein said diaphragm comprises a MEMs device.

7. The capacitor of claim 1 wherein said means to transport said at least one fluid dielectric comprises a source of heat.

8. The capacitor of claim 1 wherein said means to transport said at least one fluid dielectric comprises a magnetic field.

9. The capacitor of claim 1 wherein said means to transport said at least one fluid dielectric comprises an electric field.

10. A capacitor comprising:
a first electrode;
a second electrode, said second electrode being movable between two positions such that the separation between the first electrode and the second electrode can be changed between a maximum separation and a minimum separation;
a dielectric material between the electrodes; and
means for moving the second electrode to thereby create a phase change of the dielectric material or vary the physical properties of a supercritical fluid component of the dielectric material thus further changing the capacitance of said capacitor.

11. The capacitor of claim 10 wherein the means for moving the second electrode is expansion of the dielectric material.

12. The capacitor of claim 10 wherein the means for moving the second electrode is a mechanical means that results in a physical change of the dielectric material.

13. A capacitor comprising:
a chamber having a first end and a second end and a length therebetween;
a first electrode extending a first distance into said chamber from said first end of said chamber, said first electrode comprising a number of elements;
a second electrode extending a second distance into said chamber from said second end of said chamber, said second electrode comprising a number of elements; and
at least one fluid dielectric within said chamber, wherein at least one of said first and second distances is greater than 0.

14. The capacitor of claim 13 wherein the sum of said first distance and said second distance is greater than the length of the chamber such that said elements of said first electrode overlap said elements of said second electrode.

* * * * *